Dec. 21, 1965     C. HOROWITZ     3,224,815
BRAKE CONTROL VALVE AND SYSTEM
Filed Nov. 13, 1963     2 Sheets-Sheet 1
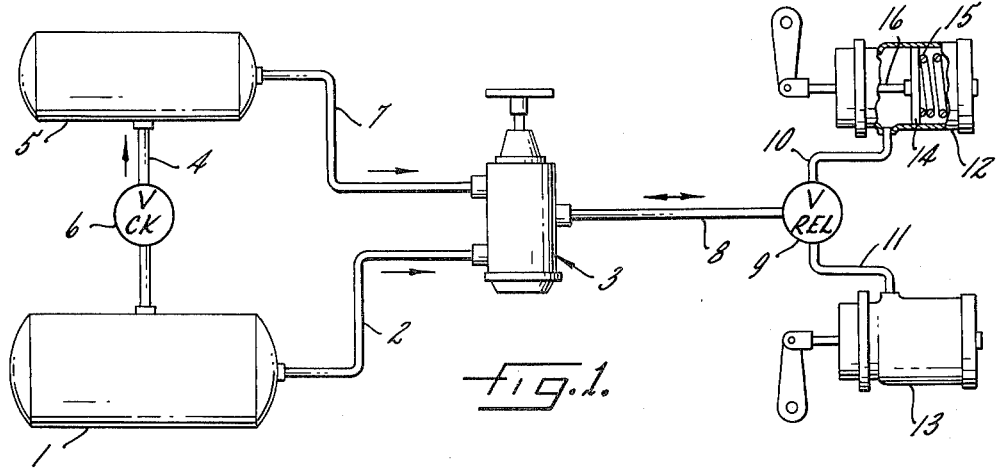
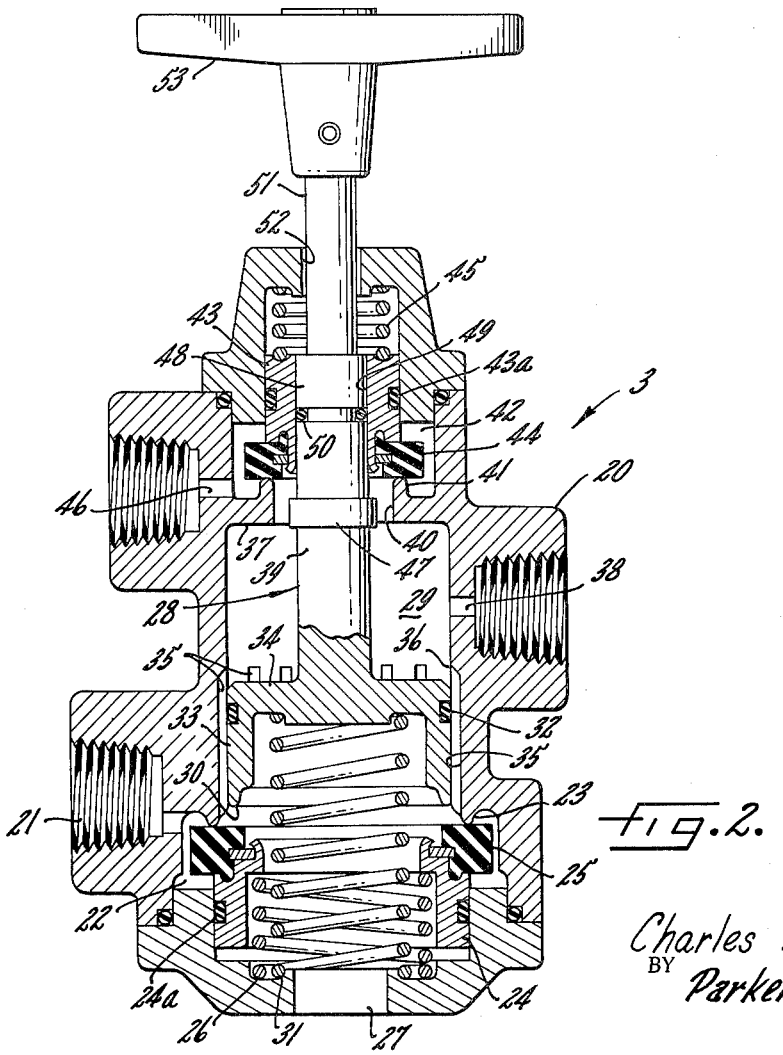
INVENTOR.
Charles Horowitz
BY Parker & Carter
Attorneys.

Dec. 21, 1965  C. HOROWITZ  3,224,815
BRAKE CONTROL VALVE AND SYSTEM
Filed Nov. 13, 1963  2 Sheets-Sheet 2

INVENTOR.
Charles Horowitz
BY Parker & Carter
Attorneys.

United States Patent Office 3,224,815
Patented Dec. 21, 1965

3,224,815
BRAKE CONTROL VALVE AND SYSTEM
Charles Horowitz, Chicago, Ill., assignor, by mesne assignments, to Berg Mfg. & Sales Co., Des Plaines, Ill., a corporation of Illinois
Filed Nov. 13, 1963, Ser. No. 323,502
8 Claims. (Cl. 303—71)

This invention relates to vehicle brake systems and has particular relation to brake systems employed with truck-trailer combinations.

One purpose is to provide a brake control valve which is effective to eliminate prior requirements for a plurality of valves and lines in a brake control system.

Another purpose is to provide a brake control system of maximum simplicity and minimum cost.

Another purpose is to provide a brake control valve which may be manually operated by the vehicle operator to accomplish a plurality of purposes.

Another purpose is to provide a brake control valve and system which shall be productive of maximum safety in vehicle operation.

Another purpose is to provide a brake control valve and system effective to accomplish automatic emergency brake application and to provide a convenient means whereby the vehicle operator may thereafter release and apply said emergency brake application.

Vehicle brake systems are known wherein a reservoir or air tank supplies air pressure for brake operation and a portion of said air pressure is employed in a brake cylinder to hold inactive a spring-actuated piston effective to apply the brakes upon loss of said air pressure. Said loss of air pressure may occur accidentally, in which case the piston acts as an emergency brake. Said pressure loss may be created by the vehicle operator and the piston then acts as a parking brake. Such systems employ, between the air reservoir and the emergency or parking brake-operating cylinder, an air line having therein a dash-mounted control valve manually operated by the vehicle operator to charge the entire system and a quick release valve controlling the air cylinders. To such systems have been added a second, protected air reservoir or tank which is filled in the course of filling the first reservoir, a check valve between the two tanks to protect the second tank, a set of lines running from the protected tank to the line from the first tank, downstream of the dash control valve at which point the line from the second tank meets a two-way check valve. From the latter the original line from the first tank is employed, through the quick release valve to the emergency operating cylinders. Between the protected tank and the two-way check valve a second dash-mounted valve has been provided for manual operation by the vehicle operator and which has a dead-man feature. Air from the protected tank can be supplied through the two-way check valve to the emergency cylinders to retract the emergency piston from brakes-on position to release the brakes and thus to permit vehicle operation, as required, after the emergency or parking brakes have been applied. Such systems thus employ two tanks, a number of lines and four valves between the source of fluid pressure and the quick release valve. It is, accordingly, one purpose of the present invention to provide a control valve effective to eliminate the requirement for such provision of a plurality of valves and lines.

Another purpose is to provide a brake control valve having means insuring against unintentional operation.

Another purpose is to provide means employing the vehicle system air pressure to release spring-actuated brakes and to eliminate the need for mechanical release of such brakes.

Another purpose is to provide the vehicle operator with brake release means within the vehicle control cabin.

Another purpose is to provide a single control valve having manually operable elements effective to charge, apply and release a parking brake and effective automatically to apply the vehicle brakes in emergencies as well as to release said emergency-applied brakes.

Other purposes will appear from time to time during the course of the specification and claims.

The invention is illustrated more or less diagrammatically in the accompanying drawings, wherein:

FIGURE 1 is a schematic representation of one form of the system of the invention;

FIGURE 2 is a cross-sectional view, on an enlarged scale, illustrating the brake control valve employed in the system illustrated in FIGURE 1;

Like parts are indicated by like numerals throughout the specification and drawings.

Figure 3:
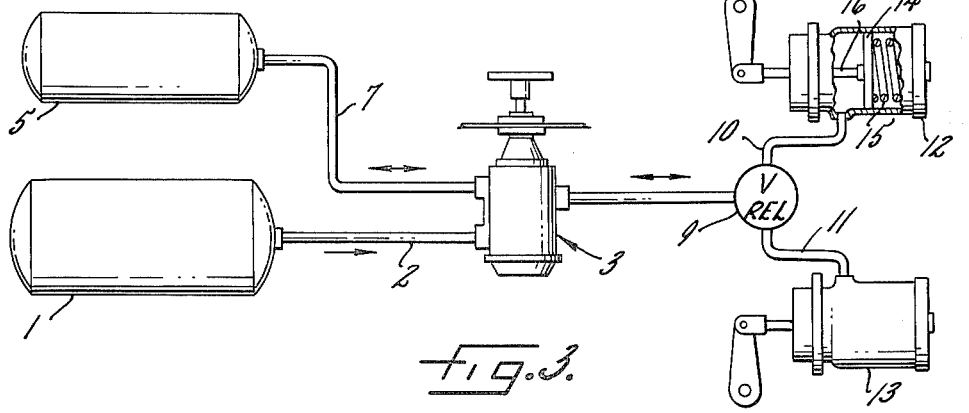
FIGURE 3 is a schematic view illustrating another form of the system of the invention.

Referring now to the drawings, and particularly to FIGURE 1 thereof, numeral 1 designates a fluid pressure reservoir or air tank. A conduit 2 extends from the tank 1 to a brake control valve 3. A conduit 4 connects the tank 1 to a second or protected fluid pressure reservoir or tank 5. The conduit 4 has, intermediate its ends, a check valve 6 permitting flow of fluid pressure from tank 1 to the tank 5 and preventing flow in the opposite direction through conduit 4. A conduit 7 connects tank 5 to the brake control valve 3. A conduit 8 connects the brake control valve 3 to a quick release valve 9. Conduits 10, 11 connect the release valve 9 to emergency and parking brake-operated cylinders 12, 13, respectively.

Since the cylinders 12, 13 are identical, it will suffice, for clarity, to describe one such cylinder. Within the cylinder 12, for example, a piston 14 is slidably mounted. A spring 15 is positioned in cylinder 12 to urge the piston toward brakes-on position. Fluid pressure is applied by conduit 10 to the opposite side of piston 14 to urge the piston away from brakes-on position. The piston has a rod 16 which extends into a service brake cylinder for contact with the normal service brake-operating elements (not shown) to move the same into brakes-on position and thus to apply the brakes.

Referring now to FIGURE 2, the brake control valve 3 is seen to include a housing 20. A first fluid pressure inlet 21 is positioned in the housing 20 for communication with the conduit 2 to deliver fluid pressure from tank 1 to a chamber 22 within the housing 20 on one side of a valve seat 23. A first valve piston 24 is mounted for reciprocation within the chamber 22 and carries a valve face 25 for seating upon the seat 23. A spring 26 is positioned to urge the piston 24 and valve face 25 toward seat 23. An exhaust outlet 27 is formed in an end wall of housing 20 and communicates with the area therewithin through the hollow valve piston 24 and the annular valve face 25. A seal 24a is carried by piston 24.

A valve control member 28 is reciprocally mounted within the housing 20 for movement within a second chamber 29. The chamber 29 communicates with chamber 22 through seat 23. The member 28 has, at its inner end, a circular valve seat 30 positioned for movement into engagement with valve face 25 to seal exhaust outlet 27 and, upon further movement of member 28, to move valve face 25 off seat 23. A spring 31 is coaxial with chamber 22 and spring 26 and extends through the hollow piston 24 and annular valve face 25 to engage member 28 and to urge the same away from valve face 25. A seal 32 is carried by the circumferential wall 33 of the head 34 of member 28 for engagement with the inner wall surface of chamber 29. A plurality of circumferentially spaced, longitudinally extending grooves 35 extend from the seat 23 to a point 36 intermediate the ends of chamber 29. Between the point 36 and the end wall 37 of chamber 29 a fluid pressure outlet 38 is formed. The outlet 38 is formed and adapted for communication with conduit 8 and through it with quick release valve 9 and cylinders 12 and 13.

The end wall 37 of chamber 29 has an opening 40 formed therein. A valve seat 41 surrounds and defines one end of the opening 40. A third chamber 42 communicates with chamber 29 through seat 41 and opening 40 and has reciprocal therewithin a second hollow valve piston 43 which in turn carries an annular valve face 44 for seating upon the seat 41. A spring 45 is positioned in the extension of chamber 42 to urge piston 43 and face 44 toward seat 41. A fluid pressure inlet 46 is formed in housing 20 for connection to conduit 7, resulting in communication between tank 5 and chamber 42. A seal 43a is carried by the piston 43 for engagement with the inner wall surface of chamber 42 extension.

The member 28 has an actuating shaft 39 extending from head 34 through and outwardly of housing 20. The shaft 39 carries an abutment 47, the diameter of which is less than that of the opening 40 and seat 41 and which is positioned for reciprocation through the opening 40 for actuating contact with the piston 43 to move piston 43 when shaft 39 is moved in one direction and thus to unseat face member 44 from seat 41. The shaft 39 has an intermediate cylindrical portion 48 reciprocal through the axial opening 49 in hollow piston 43. The seal 50 is carried by the shaft portion 48 for engagement with the wall of axial passage 49. The shaft 39 has a continuing portion 51 extending through an end aperture 52 in housing 20. A manually operable handle element 53 is secured to the outer distal end of shaft portion 51.

Figures 4, 5:
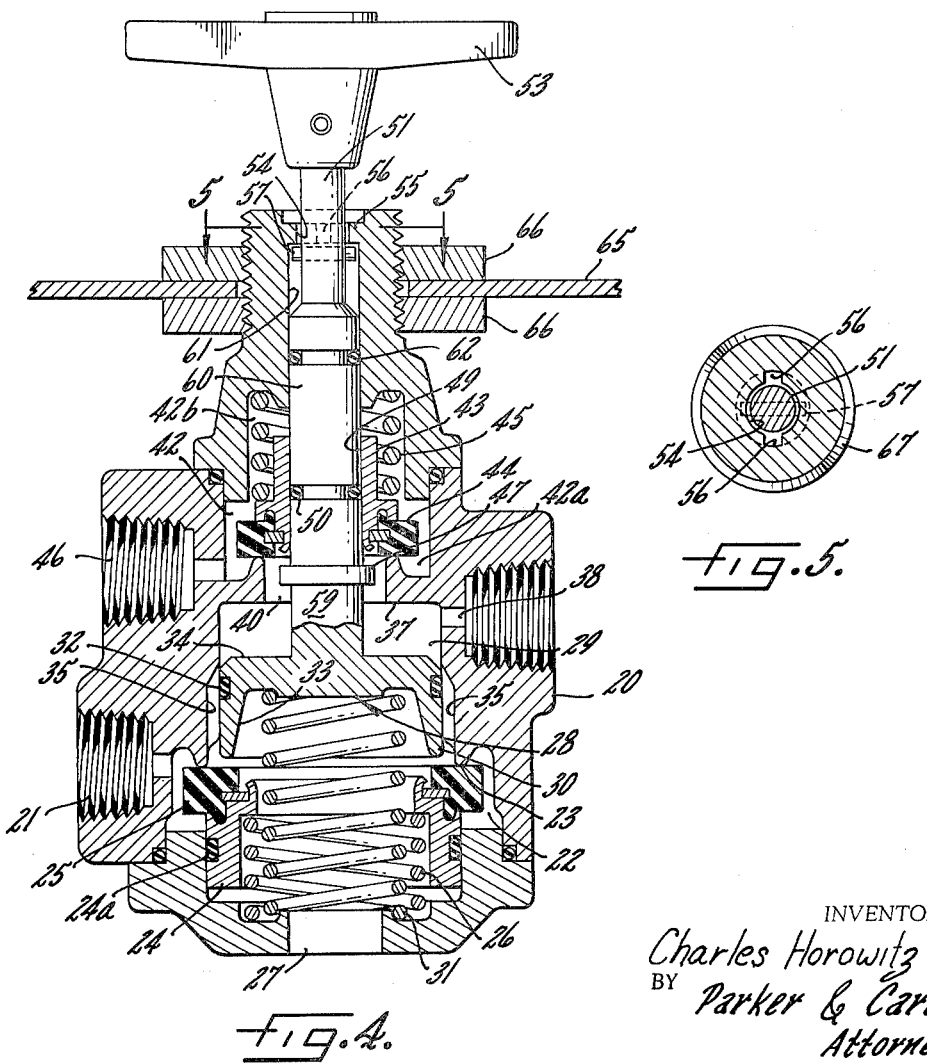
FIGURE 4 is a cross-sectional view on an enlarged scale over that of FIGURE 3 and illustrating the brake control valve employed with the system of FIGURE 3.
FIGURE 5 is a cross-sectional view taken on the line 5—5 of FIGURE 4.

Referring now to FIGURES 3 and 4, the parts therein illustrated which are identical or substantially identical to those previously described will be designated by identical numerals for clarity and ease of understanding.

It will be observed, with reference to FIGURE 3, that the conduit 4 and check valve 6 are absent therefrom.

Chamber 29, in the valve of FIGURE 4, is reduced in axial extension. The operating shaft for member 28 is designated by the numeral 59 in view of the changes therein over the shaft 39 of FIGURE 2. Similarly, the piston 43 is reduced in outer diameter and carries no outer seal, the piston 43 being reciprocal on the extended shaft portion 60 of shaft 59. The chamber 42 of the valve in FIGURE 4 has an enlarged extension in which the spring 45 is positioned and which communicates with the annular chamber portion 42a in which the annular valve face member 44 reciprocates. A further cylindrical passage or chamber extension 61 extends from and communicates with extension 42b and the shaft portion 60 extends into passage 61, carrying a seal 62 engaging the inner surface of passage 61. The shaft extension 51 extends through an opening 54. An annular flange 55 extends into the passage 61 adjacent its outer end and has a pair of diametrically opposed slots 56 formed therein to permit the passage of a pin 57 extending through and laterally from the shaft 51 when the handle 53 is turned 90 degrees in either direction from that shown in FIGURE 4. The pin 57 abuts flange 55 when control member 28 is initially withdrawn and thus prevents inadvertent actuation of shuttle member 43 by abutment 47. Handle 53 is aligned with pin 57.

A dash panel is represented at 65 and a pair of fasteners 66 are threaded upon the threads 67 formed on the outer surface and end portion of housing 20 on opposite sides of dash 65 to mount the valve of the invention on the dash. While the mounting arrangement may be varied without departing from the nature and scope of the invention, it will be understood that the structure 65–67, as well as that indicated at 55–57, may be applied when desired to the valve illustrated in FIGURE 2.

The use and operation of the invention are as follows:

Referring to the form of the invention illustrated in FIGURES 1 and 2, the system of the invention includes the main reservoir or fluid pressure source 1 effective to supply sufficient fluid pressure for braking purposes and to hold inactive the spring-piston brake-operating elements in normal operation. The vehicle operator charges the system by pressing inwardly on the handle 53 extending from the dash panel in the vehicle control cabin. Inward movement of handle 53 causes movable valve seat 30 to contact valve face 25, thus sealing off exhaust outlet 27. Continued inward movement of handle 53 causes the unseating, through the mediacy of member 28, of valve face 25 from seat 23. Thereupon, fluid pressure from tank 1, flowing through conduit 2 and into inlet 21, is permitted to flow through valve seat 23 and axially disposed passages 35 into chamber 29 and thence through outlet 38 to quick release valve 9 and from release valve 9, through conduits 10, 11, to brake cylinders 12, 13. Fluid pressure thus supplied to brake cylinders 12, 13 is effective to move pistons 14 against the action of springs 15 and to hold pistons 14 out of brake-operating position. Once the operator has pressed handle 53 inwardly the same will remain in inward position and the operator need take no further action. Fluid pressure operating upon the back face of head 34 of member 28 and upon the surface of valve face 25 outwardly of the cylindrical wall 33 of head 34 is effective to retain the member 28 in its inward position against the action of springs 26, 31.

It will be understood that the tank 1 is filled by a suitable compressor arrangement (not shown) mounted upon the vehicle.

When the air tank 1 was filled, the protected tank 5 was simultaneously filled through a one-way check valve 6 and conduit 4. The check valve 6 is effective to prevent flowback or feedback of fluid pressure from the tank 5 to the tank 1. Fluid pressure is continuously supplied by fluid pressure tank 5 through conduit 7 and inlet 46 to chamber 42. The said pressure acting upon the back surface of valve face member 44, in conjunction with the action of spring 45, is effective to retain the valve face member 44 upon its seat 41 against the action of fluid pressure within chamber 29 and thus to further protect the tank 5 from employment in the normal operation of the system.

Should a loss, or diminution below a predetermined value, of fluid pressure within the normal system occur, the pistons 14 will be actuated by springs 15 and will be moved by said springs toward brakes-on position to apply the brakes of the vehicle. Thus an automatic safety action is provided and preserved by the system and valve of the invention.

The invention further provides a manual means by which the operator may apply the brakes of the vehicle in the event that the normal brake-application system fail for reasons other than a diminution in fluid pressure. Such emergency operation can be achieved by the mere withdrawal of handle 53 by the operator. To thus apply the brakes, in either an emergency or parking situation, the vehicle operator merely withdraws handle 53 a distance sufficient to permit the seating of the valve face 25 on its seat 23 and the separation of movable valve seat 30 from valve face 25, as, for example, illustrated in FIGURE 2. Thereupon fluid pressure in the cylinders 12, 13 is exhausted through conduits 10, 11, release valve 9, conduit 8, chamber 29, channels or passages 35, hollow piston 24 and exhaust outlet 27. Upon such exhaustion of the cylinders 12, 13 the springs 15 are effective to move the piston 14 toward brakes-on position and to apply the brakes of the vehicle. Since the valve face 25 was seated upon seat 23 immediately upon withdrawal of member 28 fluid pressure in tank 1 is preserved.

The same operation is carried out by the vehicle operator in applying the parking brake of the vehicle in normal operation.

Should the vehicle brakes be applied by the action of springs 15 and pistons 14 as a result of the loss or diminution, below a predetermined value, of pressure in tank 1 or in the normal system, it oftentimes occurs that the operator desires to move the vehicle to a point of safety, for example out of a line of traffic. The system and valve of the invention are effective to permit the accomplishment of this result from the control cabin and without the necessity for the vehicle operator to leave the control cabin, crawl under the vehicle and mechanically withdraw pistons 14. To release the brakes, under such circumstances, the operator merely withdraws handle 53 a distance sufficient to bring abutment 47 into actuating contact with piston 43 and to move piston 43 and valve face 44 away from seat 41. Fluid pressure thereupon flows from tank 5 through chamber 42 and passage 40 into chamber 29. With the abutment 47 in actuating contact with piston 43, the seal 32 carried by member 28 will have been moved beyond the point 36 at which passages 35 terminate and will thus be in sealing contact with the circumferential inner surface of chamber 29 downstream of outlet 38 from passage 40 and exhaust outlet 27 is thus sealed off. Fluid pressure thus supplied to chamber 29 through passage 49 flows outwardly through outlet 38, conduit 8, quick release 9 and conduit 10, 11 to cylinders 12, 13 to retract pistons 14 from brakes-on position against the action of springs 15 and thus to release the brakes. Because such brake release is a temporary operation under an emergency-type situation, the valve of the invention is designed to require the operator to hold the handle 53 in such fully withdrawn position to keep the brakes thus released. Thus the valve serves as a type of "deadman" control. When the vehicle has been moved to the desired position, the operator releases the handle 53. Thereupon pressure within chamber 29 is effective to move member 28 into the position illustrated in FIGURE 2, the spring 31 being shown in FIGURE 2 at its maximum expansion. With the member 28 thus positioned, fluid pressure in chambers 12, 13 flows through outlet 38, chamber 29, passages 35 and hollow piston 24 and is exhausted through exhaust valve 27. Piston 43 and valve face 44 are also moved by spring 45 to bring valve face 44 into contact with seat 41 and thus to seal off and preserve the pressure within tank 5. Thus by alternately pulling out on handle 53 and releasing the same the vehicle operator may employ the fluid pressure within tank 5 to release and apply the brakes of the vehicle.

Referring now to the invention as illustrated in FIGURES 3–5, the operator intially charges the system by pressing inwardly on the handle 53. At this point the brakes are applied to the vehicle through the action of springs 15 and piston 14, there being no fluid pressure in the chambers 12, 13. With the handle 53 pressed inwardly, the movable seat 30 is seated upon the valve face 25, sealing off exhaust 27 and moving valve face 25 off seat 23 to provide for flow of fluid pressure from tank 1 through chamber 22, passages 35, chamber 29, outlet 38 and members 8, 9, 10 and 11 to chambers 12 and 13 to release the brakes by moving pistons 14 against the action of springs 15. Fluid pressure from tank 1 is also effective to unseat valve face 44 from seat 41 against the action of spring 45, there being no pressure in tank 5 at this point in the operation, and to flow through chamber 42, inlet 46 and conduit 7 to charge tank 5. Inward movement of handle 53 is effective to charge the system, to release the vehicle brakes, and to fill protected tank 5. Thus is eliminated the conduit 4 and the check valve 16.

When the pressure has built up in tank 5 and chamber 42 the said pressure is effective against the rear surface of valve face member 44 and against the rear surfaces of piston 43, in conjuction with the action of spring 45, to move valve member 44 onto its seat 41 against the action of pressure within chamber 29. Thus the member 43, 44 serves an additional check-valve function in the protection of tank 5.

Should the vehicle operator desire to apply the parking brake in the normal operation of the vehicle, the same is accomplished in a manner similar to that set forth with respect to the form of the invention illustrated in FIGURES 1 and 2, i.e. the operator merely withdraws handle 53 against the action of the pressure within chamber 29, allowing valve face 25 to seat on seat 23 and thus protecting tank 1 and, at the same time, opening up an exhaust passage from chamber 29 through passages 35 and piston 24 to the exhaust outlet 27. The spring 31 will aid in moving the member 59 into the position illustrated in FIGURE 4, at which point pin 57 has contacted abutment 55 and abutment 47 has not yet contacted piston 43. Having thus exhausted chambers 12 and 13 of fluid pressure, the springs 15 are effective to move the pistons 14 toward brakes-on position and to apply the brakes to the vehicle while it is parked.

Should a loss or diminution below a predetermined value occur in the normal system, the said pressure will be bled from chambers 12 and 13 and springs 15 will be released to apply the brakes through their action against the pistons 14, thus acting as emergency brakes.

The vehicle operator is enabled to employ the fluid pressure available in tank 5 to release the spring-actuated brakes of the vehicle. To do so the operator merely rotates handle 53 approximately 90 degrees about the axis of shaft 59 to move the pin 57 into alignment with the slots 56. It will be observed that the pin 57 locates immediately beneath the flange 55 when the operating member 59 is in the position shown in FIGURE 4. With the handle thus rotated to align the pin 57 and slots 56, the operator is enabled to withdraw the handle 53 a greater distance and thus to bring the abutment 47 into contact with the piston 43 to move it and the valve face 44 carried by the piston 43 away from seat 41 and thus to provide communication between tank 5, through conduit 7, inlet 46, chamber 42, passage 40, chamber 29, outlet 38 and elements 8–11 to chambers 12 and 13, the said withdrawal of member 59 bringing seal 32 into sealing contact with the wall of chamber 29 between outlet 38 and the inner edges of slots 35 to seal said communication against the exhaust outlet 27. Thus air pressure from tank 5 is delivered to chambers 12, 13 to move piston 14 out of brakes-on position and to release the brakes.

The presence of pin 57 and the requirement for rotation of handle 53 is effective to prevent the accidental unseating of valve face 44 when the member 59 is withdrawn by the operator to apply the brakes by exhausting chambers 12, 13 through exhaust 27, as above described. While the pin 57 and slot 56 arrangement could be employed in connection with the valve of FIGURE 2, the distances involved with the parts related as illustrated in FIGURE 2 make the likelihood of unintentional withdrawal of handle 53 a distance sufficient to unseat valve face 44 more remote.

The valve illustrated in FIGURE 2 is thus effective to perform the functions previously requiring the presence of three valves, i.e. two separate dash-mounted valves and a two-way check valve, and the valve illustrated in FIGURE 4 performs the functions of four valves previously required, i.e. two dash-mounted valves, a two-way check valve and a check valve between the main and protected tank reservoirs.

The valves of FIGURES 2 and 4 and the systems of FIGURES 1 and 3 enable the vehicle operator to apply and release the parking and emergency brakes with a single control without leaving the control cabin.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

There is claimed:

1. A brake control valve comprising a housing, a first inlet in said housing, a second inlet in said housing, a pressure outlet in said housing, an exhaust outlet in said housing, a valve positioned in said housing to control communication between said first inlet and said pressure outlet, a second valve positioned in said housing to control communication between said second inlet and said pressure outlet, a valve-operating member having a normal position, said exhaust outlet and pressure outlet being in communication when said operating member is in said normal position, said operating member being movable in one direction from said normal position to seal said exhaust outlet from said pressure outlet and to open communication between said first inlet and said pressure outlet, said operating member being movable in an opposite direction from said normal position to seal said exhaust outlet from said pressure outlet and to open communication between said second inlet and said pressure outlet, said operating member having a portion extending outwardly from said housing, a laterally extending pin carried by said portion, said housing having an outlet for said portion, an annular flange extending inwardly at said outlet, a pair of diametrically opposed slots in said flange formed and adapted for passage therethrough of the opposite ends of said pin.

2. A brake control valve comprising a housing, a first inlet in said housing, a second inlet in said housing, a pressure outlet in said housing, an exhaust outlet in said housing, a valve positioned in said housing to control communication between said first inlet and said pressure outlet, a second valve positioned in said housing to control communication between said second inlet and said pressure outlet, a valve-operating member having a normal position, said exhaust outlet and pressure outlet being in communication when said operating member is in said normal position, said operating member being movable in one direction from said normal position to seal said exhaust outlet from said pressure outlet and to open communication between said first inlet and said pressure outlet, said operating member being movable in an opposite direction from said normal position to seal said exhaust outlet from said pressure outlet and to open communication between said second inlet and said pressure outlet, said first valve member comprising a hollow piston and an annular valve face carried by said piston, said second valve member comprising a hollow piston and an annular valve face carried by said piston, said operating member having a head formed and positioned to seat upon the annular valve face of said first valve member when said operating member is moved in one direction, said operating member having a stem portion extending through said second valve member hollow piston, an abutment carried by said operating member stem portion and positioned for actuating contact with said second valve member hollow piston when said operating member is moved in said opposite direction.

3. A control valve comprising a housing, a central chamber in said housing, a first opening at one end of said chamber, a second opening at the opposite end of said chamber, outwardly directed valve seats formed at each of said openings, a first valve face yieldingly urged toward engagement with said first opening valve seat, a second valve face yieldingly urged toward engagement with said second opening valve seat, means for moving said valve faces off of said valve seats, said means comprising a control member, said control member having a head reciprocal in said chamber, said head having a valve seat end portion engageable with said first valve member face, said control member having a stem portion reciprocal through said second valve face and carrying an abutment engageable with said second valve face, said abutment being reciprocal through said second opening, an exhaust outlet and a pressure outlet in said housing, said pressure outlet communicating with said chamber on one side of said control member head, said exhaust outlet communicating with said chamber on one side of said control member head, said exhaust outlet communicating with said chamber on the opposite side of said control member head, a seal carried by said control member and positioned to seal said exhaust outlet from said pressure outlet when said control member head is moved in one direction in said chamber.

4. A control valve comprising a housing, a central chamber in said housing, a first opening at one end of said chamber, a second opening at the opposite end of said chamber, outwardly directed valve seats formed at each of said openings, a first valve face yieldingly urged toward engagement with said first opening valve seat, a second valve face yieldingly urged toward engagement with said second opening valve seat, means for moving said valve faces off of said valve seats, said means comprising a control member, said control member having a head reciprocal in said chamber, said head having a valve seat end portion engageable with said first valve member face, said control member having a stem portion reciprocal through said second valve face and carrying an abutment engageable with said second valve face, said abutment being reciprocal through said second opening, an exhaust outlet and a pressure outlet in said housing, said pressure outlet communicating with said chamber on one side of said control member head, said exhaust outlet communicating with said chamber on one side of said control member head, said exhaust outlet communicating with said chamber on the opposite side of said control member head, a seal carried by said control member and positioned to seal said exhaust outlet from said pressure outlet when said control member head is moved in one direction in said chamber, a fluid pressure inlet in said housing positioned to deliver fluid pressure outwardly of said first opening valve seat, a second fluid pressure inlet in said housing positioned to deliver fluid pressure outwardly of said second opening valve seat.

5. A brake system comprising at least one brake-operating cylinder, a piston reciprocal in said cylinder, a spring on one side of said piston positioned to urge said piston toward brakes-on position, an air chamber on the opposite side of said piston and means for delivering and withdrawing fluid pressure to and from said chamber, said means comprising a source of fluid pressure and lines communicating said source with said cylinder, a control valve in said lines, said control valve comprising a housing, a pressure outlet formed on said housing for communication with said cylinder, a pair of pressure inlets formed in said housing for communication with said pressure source, an exhaust outlet in said housing, valve means between each of said inlets and said pressure outlet, and a control member reciprocal in said housing, said control member having a normal position, said pressure and exhaust outlets being in communication one with the other when said control member is in said normal position, said control member being movable in one direction to seal said outlets against communication one with the other and to operate one of said valve members to open communication between one of said inlets and said pressure outlet, said control member being movable in the opposite direction to seal said outlets against communication one with the other and to actuate the other of said valve members to open communication between the other of said inlets and said pressure outlet, abutment means restricting the movement of said control member in one of said directions, said abutment means being rotatable to remove said movement restriction.

6. For use with a brake cylinder having a spring-actuated piston therein and an air chamber on one side of said piston, means for applying and withdrawing air pressure to and from said chamber, said means including a first reservoir, a second reservoir, a control valve, said control valve having a pressure outlet communicating with said chamber, a first pressure inlet communicating with said first reservoir, a second pressure inlet communicating with said second reservoir, an exhaust outlet, a first valve means between said first inlet and said pressure outlet, a second valve means between said second pressure inlet and said pressure outlet, a reciprocal operating member, said operating member being movable in one direction to move said first valve and to open communication between said first pressure inlet and said pressure outlet to charge said chamber, said operating member being held in said position by the fluid pressure within said control valve, said operating member being movable in the opposite direction to unseat said second valve member and to open communication between said second pressure inlet and said pressure outlet to supply fluid pressure to said chamber, said operating member having a normal position, said exhaust outlet being in communication with said pressure outlet to exhaust said chamber through said valve when said operating member is in said normal position, said operating member carrying sealing means and sealing said exhaust outlet against communication with said pressure outlet when said operating member is in operating engagement with said first and second valve members.

7. For use with a brake cylinder having a spring-actuated piston therein and an air chamber on one side of said piston, means for applying and withdrawing air pressure to and from said chamber, said means including a first reservoir, a second reservoir, a control valve, said control valve having a pressure outlet communicating with said chamber, a first pressure inlet communicating with said first reservoir, a second pressure inlet communicating with said second reservoir, an exhaust outlet, a first valve means between said first inlet and said pressure outlet, a second valve means between said second pressure inlet and said pressure outlet, a reciprocal operating member, said operating member being movable in one direction to move said first valve and to open communication between said first pressure inlet and said pressure outlet to charge said chamber, said operating member being held in said position by the fluid pressure within said control valve, said operating member being movable in the opposite direction to unseat said second valve member and to open communication between said second pressure inlet and said pressure outlet to supply fluid pressure to said chamber, said operating member having a normal position, said exhaust outlet being in communication with said pressure outlet to exhaust said chamber through said valve when said operating member is in said normal position, said operating member carrying sealing means and sealing said exhaust outlet against communication with said pressure outlet when said operating member is in operating engagement with said first and second valve members, yielding means in said control valve effective to move said second valve member to sever communication between said second inlet and said pressure outlet against the action of fluid pressure within said control valve member.

8. For use with a brake cylinder having a spring-actuated piston therein and an air chamber on one side of said piston, means for applying and withdrawing air pressure to and from said chamber, said means including a first reservoir, a second reservoir, a control valve, said control valve having a pressure outlet communicating with said chamber, a first pressure inlet communicating with said first reservoir, a second pressure inlet communicating with said second reservoir, an exhaust outlet, a first valve means between said first inlet and said pressure outlet, a second valve means between said second pressure inlet and said pressure outlet, a reciprocal operating member, said operating member being movable in one direction to move said first valve and to open communication between said first pressure inlet and said pressure outlet to charge said chamber, said operating member being held in said position by the fluid pressure within said control valve, said operating member being movable in the opposite direction to unseat said second valve member and to open communication between said second pressure inlet and said pressure outlet to supply fluid pressure to said chamber, said operating member having a normal position, said exhaust outlet being in communication with said pressure outlet to exhaust said chamber through said valve when said operating member is in said normal position, said operating member carrying sealing means and sealing said exhaust outlet against communication with said pressure outlet when said operating member is in operating engagement with said first and second valve members, said second valve member comprising a shuttle slidable on said control member and movable to open communication between said first inlet and said second inlet to charge said second reservoir when said first valve member has opened communication between said first inlet and said pressure outlet.

References Cited by the Examiner
UNITED STATES PATENTS

| 2,820,372 | 1/1958 | Edge et al. | 303—52 |
| 3,107,126 | 10/1963 | Valentine | 303—85 |

FOREIGN PATENTS 345,061 3/1931 Great Britain.

EUGENE G. BOTZ, *Primary Examiner.*